Figure 1:
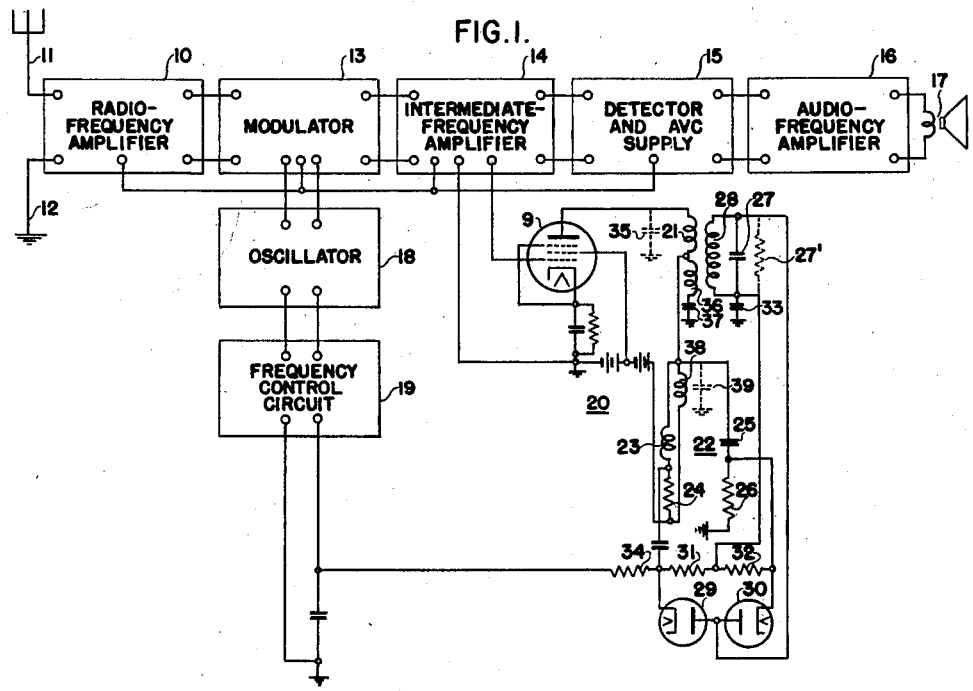

March 7, 1939.   H. A. WHEELER   2,150,044

FREQUENCY SELECTIVE NETWORK

Filed Oct. 1, 1937   2 Sheets-Sheet 1

INVENTOR
HAROLD A. WHEELER
BY Laurence B. Dodds
ATTORNEY

Patented Mar. 7, 1939

2,150,044

UNITED STATES PATENT OFFICE 2,150,044

FREQUENCY SELECTIVE NETWORK

Harold A. Wheeler, Great Neck, N. Y., assignor to Hazeltine Corporation, a corporation of Delaware Application October 1, 1937, Serial No. 166,749

8 Claims. (Cl. 250—20)

The present invention relates to an improved frequency-selective network and, particularly, to a frequency detector having a substantially linear characteristic and adapted for demodulation of a frequency-modulated carrier wave.

Much of the objectionable interference, especially background noise, normally present in short wave reception can be eliminated if the signal-carrier wave is frequency-modulated as distinguished from amplitude-modulated. For satisfactory reception of a frequency-modulated carrier, however, a detector having a substantially linear frequency characteristic is essential. Furthermore, from the standpoint of sensitivity, it is desirable that the characteristic curve of the detector should be quite steep. A detector having such a characteristic is also an improvement in automatic frequency control systems over the type of detector which is now being used, for the reason that the frequency-correcting force or potential changes rapidly and uniformly with respect to the extent of mistuning.

A type of detector which has previously been used for automatic frequency control systems, but which is unsatisfactory for use in demodulating a frequency-modulated carrier, utilizes the principle of rectifying separately the sum and the difference of the voltages existing across the primary and secondary of a double-tuned circuit and combining differentially the rectified voltages so obtained to provide a voltage varying in magnitude and polarity with the frequency applied to the primary of the detector. A disadvantage of such an arrangement is that the magnitude of the output of each of the rectifiers varies only gradually through a minimum value at a frequency beyond the operating range of the detector. Thus, when the difference of the rectified voltages is taken, the output voltage of the detector varies gradually with respect to frequency through maximum and minimum values, resulting in a characteristic which is non-linear and has a slope which is not as steep as required for a frequency detector to be used in demodulating a frequency-modulated carrier wave.

It is an object of the invention, therefore, to provide a frequency detector the output of which is substantially linear with respect to frequency over an appreciable frequency range.

It is a further object of the invention to provide a frequency detector having a relatively abrupt discontinuity in the frequency-output characteristic at the maximum and minimum thereof.

In accordance with one embodiment of the invention, a tuned circuit and a bridge circuit having reactive arms are coupled to an input circuit so that the voltage of each of the reactive arms of the bridge is substantially constant in phase and magnitude with respect to the voltage of said tuned circuit and equal to such voltage at the limiting frequencies of the range of the detector. Voltages proportional to the difference between the voltage of the individual reactance arms and the tuned circuit are derived, rectified, and differentially combined to procure a frequency-voltage characteristic for the detector which is substantially linear between the two points corresponding to minima of the above-mentioned difference curves and in which the output voltage decreases rapidly for frequencies further displaced from the mean resonant frequency of the tuned circuit.

For a better understanding of the invention, together with other and further objects thereof, reference is had to the following description taken in connection with the accompanying drawings, and its scope will be pointed out in the appended claims.

Figure 2:
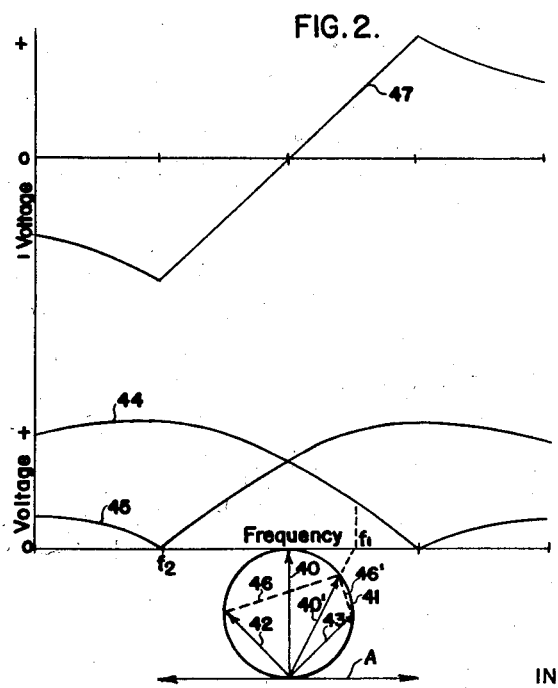
Figure 3:
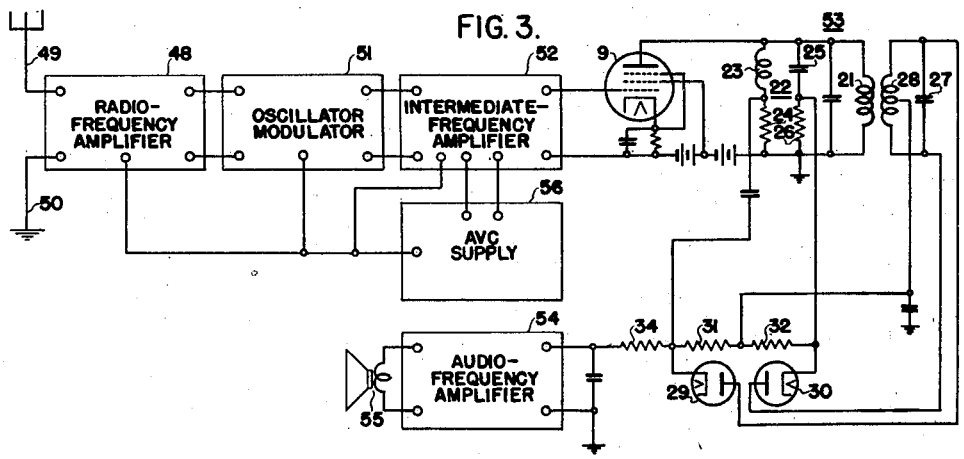
Figure 4:
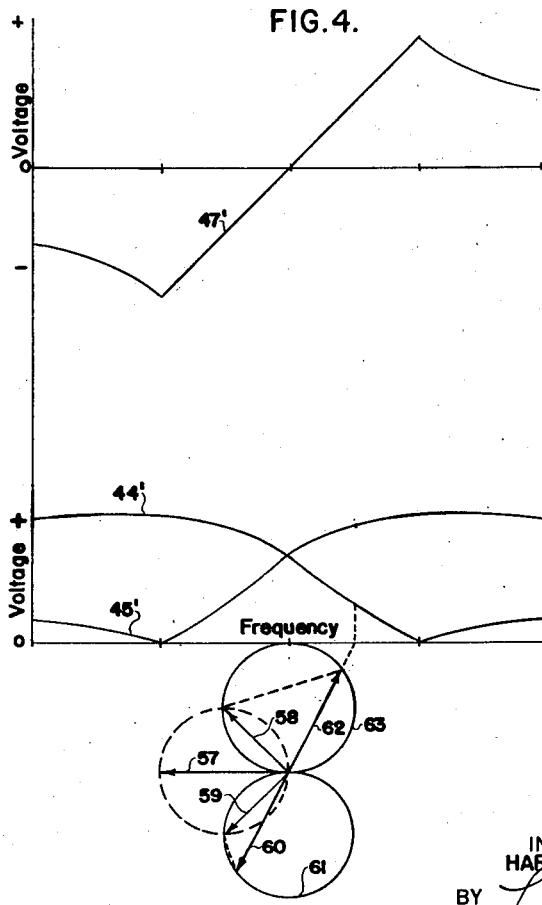

Referring now to the drawings, Fig. 1 is a circuit diagram, partially schematic, of a complete superheterodyne receiver embodying the invention in a frequency detector of an automatic frequency control circuit of the receiver; Fig. 2 illustrates certain operating characteristics of the circuit of Fig. 1; Fig. 3 is a circuit diagram of a complete superheterodyne receiver embodying the invention as a second detector; and Fig. 4 illustrates certain operating characteristics of the circuit of Fig. 3.

Referring now more particularly to Fig. 1, there is shown schematically a complete superheterodyne radio receiver of a conventional design embodying the present invention in a preferred form. In general, the receiver includes a radio-frequency amplifier 10 having its input circuit connected to an antenna 11 and ground 12, and its output circuit connected to a frequency changer or modulator 13. Connected in cascade with the frequency changer 13, in the order named, are an intermediate-frequency amplifier 14 of one or more stages, a detector and A. V. C. supply 15, an audio-frequency amplifier 16 of one or more stages, and a sound reproducer 17. An automatic amplification control bias derived from A. V. C. supply 15 is applied to the grids of one or more of the tubes of amplifier 10, oscillator-modulator 13, and intermediate-frequency amplifier 14 in order to maintain the signal input to the detector within a narrow range for a wide range of received signal amplitudes. Local oscillator 18, the output of which is coupled into modulator 13, has its frequency controlled by the frequency-control circuit 19, which may be of conventional arrangement, in accordance with the amplitude of a potential supplied by a frequency detector 20.

It will be understood that the various circuits just described may be of a conventional construction and operation, the details of which are well known in the art, rendering further description thereof unnecessary. Considering briefly the operation of the receiver as a whole and neglecting for the moment the operation of the frequency detector 20, per se, presently to be described, a desired signal is selected and amplified by radio-frequency amplifier 10, converted to a modulated intermediate-frequency signal in frequency changer 13, amplified by intermediate-frequency amplifier 14, and rectified by detector 15, thereby deriving the audio frequencies of modulation and automatic amplification control-bias potential. The audio frequencies of modulation are, in turn, amplified in audio-frequency amplifier 16 and reproduced by sound reproducer 17. The automatic amplification control circuit serves to maintain the volume output of the receiver within a narrow range for a wide range of received signal amplitudes.

Referring now more particularly to the parts of the system embodying the present invention, there is provided, coupled to intermediate-frequency amplifier 14, a frequency-detector circuit 20 which supplies a bias potential to the frequency-control circuit 19, thereby to control the output frequency of oscillator 18. The detector circuit 20 comprises a vacuum tube 9 having input electrodes connected across the intermediate-frequency channel of the receiver and output electrodes connected across an inductance 21 and a reactive bridge 22 connected in series. The reactance bridge comprises two arms effectively connected in parallel, one arm including series-connected inductance 23 and resistor 24, the other arm including series-connected condenser 25 and resistor 26. A secondary circuit 27, 28 sharply tuned to the mean frequency of the intermediate channel of the receiver and having an inherent parallel resistance represented by resistor 27' is closely coupled to inductance 21. The difference of the voltages appearing across resistor 24 and the tuned secondary circuit 27, 28 is rectified by a rectifier 29, while the difference of the voltages appearing across resistor 26 and the tuned secondary circuit 27, 28 is rectified by a rectifier 30. Load resistors 31 and 32 are provided for rectifiers 29 and 30, respectively, the common terminal of resistors 31 and 32 being effectively grounded for alternating currents through a condenser 33. The difference of the output voltages of rectifiers 29 and 30 is applied through a resistor 34 to the input terminals of frequency-control circuit 19 to control the frequency of oscillator 18 in a conventional manner.

Condenser 35, shown in dotted lines in the drawings, represents the inherent output capacitance of tube 9 and to neutralize the effect of this condenser an inductance 36 and condenser 37 are effectively connected in series between the low-potential terminal of inductance 21 and ground. An inductance 38 is connected in parallel with the reactance bridge 22 to compensate the inherent parallel capacitance of the arms represented by condenser 39 in the drawings.

In considering the operation of the frequency detector 20 just described, reference is had to the curves of Fig. 2 which represent certain of its operating characteristics.

It will be seen that the output voltage of tube 9 is applied to the inductance 21 and bridge 22 in series. The current supplied to reactance bridge 22 through inductance 21 is divided into two parts, one of which flows through inductance 23 and resistor 24 in series to ground through the voltage source for tube 9, and the other of which flows through condenser 25 and resistance 26 to ground.

In Fig. 2, vector 40 represents the voltage across secondary circuit 27, 28 at the mean resonant frequency of the system, which is the normal intermediate frequency of the receiver, the voltage across inductance 21, represented by the vector A, being taken as the reference voltage. The circle 41 represents the locus of the rotating vector 40 as the frequency of the input to the detector is varied above and below the mean resonant frequency of the circuit. Vectors 42 and 43 represent, respectively, the voltages across resistors 26 and 24, the constants of the reactive bridge 22 being so selected that the phases of these vectors do not vary appreciably with frequency relative to reference vector A. Further, the arms of bridge 22 are balanced so that, at the mean resonant frequency of the system, vectors 42 and 43, representing the voltages across resistors 26 and 24, respectively, are displaced 45 degrees on either side of the vector 40.

Curve 44 of Fig. 2 represents the relation between output voltage of rectifier 29 and frequency, comprising the rectified difference of the vector 43 and the vector 40, as the vector 40 moves around the circle 41. Similarly, curve 45 represents the relation between the rectified output voltage of rectifier 30 and frequency, that is, the rectified difference voltage of vectors 40 and 42, as vector 40 moves around the circle 41. Thus, to obtain points on curves 44 and 45 at a frequency $f_1$, the vector 40' may be taken as representing the position of the vector 40 at this frequency. The difference between vectors 42 and 40' is represented by the dotted vector 46 and is proportional to the ordinate of curve 45 at the frequency $f_1$. Similarly, the difference between vectors 43 and 40', represented by vector 46, is proportional to the ordinate of curve 44 at the frequency $f_1$. Curve 47 shows the frequency-output characteristic of detector 20 and is obtained by differentially combining curves 44 and 45. It will thus be seen that, as the vector 40 moves around the circle 41, the voltage across rectifier 29 is zero at the same instant that the voltage across rectifier 30 is a maximum and vice versa. Thus, when the output voltages of the rectifiers 29 and 30 are subtracted, curve 47 varies sharply as a frequency is reached at which one of the rectifier voltage outputs is a maximum and the other is zero. Furthermore, the portion of the curve lying between this frequency and the mean resonant frequency of the circuit is substantially a straight line.

The following circuit constants are given as illustrative of a specific embodiment of the invention:

Mean resonant frequency of circuit 27, 28 = 112 kilocycles.

Resistor 27' = resistor 24 = resistor 26 = 10,000 ohms.

Inductance 23 = 14 millihenries.

Condenser 25 = 140 micro-microfarads.

Mutual inductance between inductances 21 and 28=0.25 millihenry.

Inductance 28=0.25 millihenry.

Condenser 27=8000 micro-microfarads.

Inductance 38 to have a value of the order of 50 millihenries.

Another embodiment of the invention is shown in Fig. 3, comprising a schematic diagram of a complete superheterodyne radio receiver of a conventional design embodying the present invention as the second detector of the receiver. In general, the receiver includes a radio-frequency amplifier 48 having its input circuit connected to an antenna 49 and ground 50, and its output circuit connected to a frequency changer or oscillator-modulator 51. Connected in cascade with oscillator-modulator 51, in the order named, are an intermediate-frequency amplifier 52, a detector circuit 53, an audio-frequency amplifier 54, and a sound reproducer 55. An automatic amplification control or A. V. C. rectifier 56 is coupled across the intermediate-frequency channel of the receiver and supplies an automatic amplification control bias to one or more of the tubes of radio-frequency amplifier 48, oscillator-modulator 51, and intermediate-frequency amplifier 52. The operation of the system as a whole is entirely similar to that of Fig. 1, described above, except that the signal carrier is frequency-modulated and the A. V. C. potentials are derived from a separate supply 56.

The frequency-detector circuit 53 is similar in many respects to the frequency-detector circuit 20 shown in Fig. 1, and like parts have been given similar reference numerals. Detector circuit 53 differs from detector 20 primarily in the fact that reactance bridge 22 is connected in parallel with inductance 21 across the output circuit of tube 9 rather than in series with inductance 21, as in Fig. 1, and in that the mid-tap of inductance 28 of the circuit of Fig. 3 is connected to the common terminal of resistors 31 and 32. Also, in this embodiment, the inductance 28 is only loosely or moderately coupled to inductance 21. The characteristic curves of the detector circuit 53, corresponding to those shown in Fig. 2 for detector circuit 20, are shown in Fig. 4. Vector 57, representing the voltage across the primary inductance 21, is taken as a reference vector, while vectors 58 and 59, respectively, represent the voltages appearing across resistors 24 and 26 of bridge 22 and correspond to vectors 43 and 42, respectively, of Fig. 2. The voltage appearing across the lower half of secondary inductance 28 is represented by vector 60, having a locus 61, and the voltage appearing across the upper half of secondary inductance 28 is represented by vector 62 having a locus 63. Curves 44', 45', and 47' are similarly attained and substantially identical with curves 44, 45, and 47 of Fig. 2. From the description of the operation given with respect to the circuit of Fig. 1, it is believed that the operation of the detector 53 of Fig. 3 will be readily apparent rendering a further description thereof unnecessary.

It will be understood that while, in the embodiments described, two rectifiers have been used, a frequency detector using the principles of the present invention can be obtained if one of the rectifiers is omitted. Thus, referring to curve 45 of Fig. 2, it is seen that the portion of the curve between frequency $f_2$ and frequency $f_1$ is substantially a straight line down to the point of zero voltage on the curve.

While there have been described what are at present considered to be the preferred embodiments of the invention, it will be apparent to those skilled in the art that various changes and modifications may be made therein without departing from the invention, and it is, therefore, aimed in the appended claims to cover all such changes and modifications as fall within the true scope and spirit of the invention.

What is claimed is:

1. A frequency-selective network for operation over a given frequency range comprising an input circuit, means coupled to said input circuit for deriving a first voltage, a selective circuit coupled to said input circuit for deriving a second voltage varying in phase and magnitude with frequency with respect to said first voltage, said first and second voltages being equal in phase and magnitude at one of the limiting frequencies of said range, and means for deriving and rectifying a third voltage proportion to the difference of said first voltage and said second voltage.

2. A frequency-selective network for operation over a given frequency range comprising an input circuit, a tuned circuit coupled to said input circuit, means for deriving a voltage from said input circuit the phase and magnitude of which vary with frequency with respect to the voltage across said tuned circuit and which is equal in phase and magnitude to the voltage across said tuned circuit at one of the limiting frequencies of said range, and means for deriving and rectifying a voltage proportional to the difference of said derived voltage and the voltage across said tuned circuit.

3. A frequency-selective network for operation over a given frequency range comprising an input circuit, a tuned circuit resonant at the mean frequency of said range coupled to said input circuit, means for deriving two voltages substantially equally and oppositely displaced in phase with respect to the voltage across said tuned circuit at the resonant frequency thereof and constant in phase and magnitude with respect to the voltage across said input circuit, said two voltages being equal to the voltage across said tuned circuit at different frequencies of said range, means for deriving and rectifying two voltages, each proportional to the difference between one of said first-mentioned two voltages and the voltage across said tuned circuit, and means for deriving a voltage proportional to the difference of said two rectified voltages.

4. A frequency-selective network for operation over a given frequency range comprising an input circuit, a tuned circuit resonant at the mean frequency of said range and coupled to said input circuit, means for deriving two voltages oppositely displaced in phase substantially 45 degrees with respect to the resonance voltage across said tuned circuit and constant in phase and magnitude with respect to the voltage across said input circuit, said two voltages being equal to the voltage across said tuned circuit at different frequencies of said range, means for deriving and rectifying two voltages each proportional to the difference between one of said first-mentioned two voltages and the voltage across said tuned circuit, and means for deriving a voltage proportional to the difference of said two rectified voltages.

5. A frequency-selective network for operation over a given frequency range comprising an input circuit, a tuned circuit resonant at the mean frequency of said range and coupled to said input circuit, a reactance bridge for deriving two voltages substantially equally and oppositely displaced in phase with respect to the resonance voltage across said tuned circuit, said two voltages being constant in phase and magnitude with respect to the voltage across said input circuit and being equal to the voltage across said tuned circuit at different frequencies of said range, means for deriving and rectifying two voltages each proportional to the difference of one of said first-mentioned two voltages and the voltage across said tuned circuit, and means for deriving a voltage proportional to the difference of said two rectified voltages.

6. A frequency-selective network for operation over a given frequency range comprising an input circuit, a tuned circuit resonant at the mean frequency of said range and including a primary circuit coupled to said input circuit, a reactance bridge in series with said primary circuit for deriving two voltages substantially equally and oppositely displaced in phase with respect to the resonant voltage across said tuned circuit, said two voltages being constant in magnitude and phase with respect to the voltage across said input circuit and being equal to the voltage across said tuned circuit at different frequencies of said range, means for deriving and rectifying two voltages each proportional to the difference between one of said first-mentioned two voltages and the voltage across said tuned circuit, and means for deriving a voltage proportional to the difference of said two rectified voltages.

7. A frequency-selective network for operation over a given frequency range comprising an input circuit, a tuned circuit resonant at the mean frequency of said range and including a primary circuit coupled to said input circuit, a reactance bridge in parallel with said primary circuit for deriving two voltages substantially equally and oppositely displaced in phase with respect to the voltage across said input circuit, said two voltages being constant in phase and magnitude with respect to the voltage across said input circuit and being equal to the voltage across said tuned circuit at different frequencies of said range, means for deriving and rectifying two voltages each proportional to the difference between one of said first-mentioned two voltages and the voltage across said tuned circuit, and means for deriving a voltage proportional to the difference of said two rectified voltages.

8. A frequency-selective network for operation over a given frequency range comprising an input circuit, a tuned circuit resonant at the mean frequency of said range and coupled to said input circuit, means for deriving two voltages substantially equally and oppositely displaced in phase with respect to the resonant voltage across said tuned circuit, said two voltages being constant in phase and magnitude with respect to the voltage across said input circuit and being equal to the voltage across said tuned circuit at different frequencies of said range, reactance means for compensating the effect of the inherent circuit reactance upon said two voltages and upon the voltage of said tuned circuit, means for deriving and rectifying two voltages each proportional to the difference between one of said first-mentioned two voltages and the voltage across said tuned circuit, and means for deriving a voltage proportional to the difference of said two rectified voltages.

HAROLD A. WHEELER.